US008066619B2

(12) United States Patent
Herchick et al.

(10) Patent No.: US 8,066,619 B2
(45) Date of Patent: Nov. 29, 2011

(54) CLUTCH CONTROL SYSTEM

(75) Inventors: Robert E. Herchick, Copley, OH (US); David C. Heidenrcich, Akron, OH (US); Erik L. Olson, Copley, OH (US); Joseph W. Guinter, Bay Village, OH (US); David A. Peterman, Akron, OH (US); Arthur F. Gouker, North Olmsted, OH (US); Timothy A. Clapp, Sharon Center, OH (US)

(73) Assignee: PT Tech, Inc, Sharon Center, OH (US)

( * ) Notice: Subject to any disclaimer, the term of this patent is extended or adjusted under 35 U.S.C. 154(b) by 891 days.

(21) Appl. No.: 12/148,472

(22) Filed: Apr. 19, 2008

(65) Prior Publication Data

US 2009/0264253 A1    Oct. 22, 2009

(51) Int. Cl.
    *B60W 10/02* (2006.01)
(52) U.S. Cl. .......................................... 477/175
(58) Field of Classification Search ............... 701/67, 701/68; 477/72, 71, 70, 76, 166, 181, 174, 477/98, 97; 192/82 T, 103 F, 85.63, 54.3, 192/54.4, 54.1, 56.3
    See application file for complete search history.

(56) References Cited

U.S. PATENT DOCUMENTS

| | | | | |
|---|---|---|---|---|
| 4,150,497 A | * | 4/1979 | Weber | 434/71 |
| 4,930,608 A | * | 6/1990 | Schenk et al. | 192/3.29 |
| 5,679,099 A | * | 10/1997 | Kato et al. | 477/176 |
| 6,557,687 B1 | * | 5/2003 | Herchick | 192/104 F |
| 6,564,915 B2 | * | 5/2003 | Lorentz et al. | 192/3.58 |
| 6,631,317 B2 | * | 10/2003 | Lu et al. | 701/45 |
| 7,416,068 B2 | * | 8/2008 | Ray et al. | 192/82 T |
| 7,509,203 B2 | * | 3/2009 | Imamura et al. | 701/67 |
| 7,630,812 B2 | * | 12/2009 | Jiang et al. | 701/68 |
| 7,651,441 B2 | * | 1/2010 | Maguire et al. | 477/181 |
| 7,673,451 B2 | * | 3/2010 | Anderson et al. | 60/414 |
| 7,686,112 B2 | * | 3/2010 | Shiiba | 180/65.275 |
| 7,828,695 B2 | * | 11/2010 | Inoue et al. | 477/34 |
| 7,885,748 B2 | * | 2/2011 | Fayyad et al. | 701/58 |

* cited by examiner

*Primary Examiner* — Justin Holmes
*Assistant Examiner* — David J Hlavka
(74) *Attorney, Agent, or Firm* — Renner, Kenner, Greive, Bobak, Taylor & Weber (57) ABSTRACT

A clutch control system is interposed between an engine and a piece of driven equipment. The clutch control system includes a clutch assembly with input and output speed sensors for providing signals corresponding to the shaft rotational speeds of the engine and the driven equipment, respectively. A pressure sensor is connected to the clutch assembly and provides an output signal corresponding to clutch pressure. A temperature sensor is also associated with the clutch assembly and provides a temperature signal corresponding to the operating temperature of the clutch assembly. Transducers of various types are also employed to sense operating conditions such as shock loads or the like. Also included is a machine control system connected to the driven equipment and an engine control module connected to the engine, both of which are interconnected through an SAE J1939 CAN to the clutch control unit. These signals are passed to a clutch control unit that employs the signals to assess the operating conditions of the system and accordingly adjust the clutch pressure through a pressure control valve. A vast array of operating data is available from the system and is employed by the clutch control unit to ensure optimum operation, by tailoring the clutch pressure to the engine and driven equipment, thus minimizing clutch slippage and avoiding or instantaneously correcting shock load situations.

23 Claims, 4 Drawing Sheets

CLUTCH CONTROL SYSTEM

TECHNICAL FIELD

The invention herein resides in the art of power transmission devices and, more particularly, to torque limiting clutches and control systems associated therewith. Specifically, the invention relates to an adaptive clutch control system that serves to optimize the operational efficiency of the equipment with which the torque limiting clutch and control system are employed, while continuing to maintain and optimize the protection provided that equipment and associated power source.

BACKGROUND ART

The utilization of torque limiting clutches to protect interengaged engines and driven equipment is now well known. However, such torque limiting clutches and associated control systems have typically been of a nature as to be specifically tailored to both the engine and the driven equipment and without adaptation to change parameters during operation as a consequence of operational characteristics actually sensed during operation. Indeed, prior art systems have not been given to change at all once the system is configured, rendering such systems substantially inflexible to adapting to varying operational conditions. Further, the prior art has not sought to integrate the torque limiting clutch and control system with the system as a whole, such that the torque setting of the clutch may be set automatically to match the torque capability of the engine or the drive system. Indeed, the prior art has not seen the wisdom of interconnecting the torque limiting clutch and its control system to the SAE J1939 CAN Bus Network of the equipment, so that the clutch and its control system are an integral part thereof and can be adjusted as a function of the system as a whole.

The prior art is further devoid of a structure or a technique for monitoring the operating temperature of the torque limiting clutch friction pack such that the energy absorption can be monitored during operation and clutch disengagement can be entertained at a time sufficient to prevent premature failure.

Prior art torque limiting clutch control systems have not been given to maximizing the effective operation of the clutch to prevent overload conditions by providing a constant monitoring of the operating conditions of the clutch to determine the amount of energy absorbed thereby and to immediately disengage the clutch when a predetermined energy threshold is exceeded. Clutch failures with associated cost and downtime have typically been incident to power transmission devices in the past because of the absence of this capability.

The prior art specifically appears devoid of an adaptive system in which change in clutch pressure, with a consequent change in the clutch torque setting, can be effected on the fly, when it is determined that the clutch slippage is not appropriate and efficient torque protection is not being obtained. Moreover, known systems do not allow for increases or decreases in clutch pressure to alter clutch operation, as needed, to ensure the effective operation of the system when anomalies in operation are encountered.

Another shortcoming of existing torque limiting clutch control systems is the absence of ancillary sensors that can anticipate operational problems and force the disengagement of the clutch or shutdown of the equipment prior to the occurrence of an otherwise damaging event. There simply is a void in the art of a fully adaptive torque limiting clutch control system configured for implementation between an engine and a piece of driven equipment, that ensures the effective operation of that equipment while simultaneously ensuring the protection thereof.

DISCLOSURE OF THE INVENTION

In light of the foregoing, it is a first aspect of the invention to provide a torque limiting clutch control system that is extensively adaptive in nature, accommodating changes in settings and operational format as a function of the nature of the engine and associated equipment that it connects, as well as changes in operational environment.

Another aspect of the invention is the provision of a torque limiting clutch control system that changes its operational parameters during operation, and as a function of operating conditions.

Another aspect of the invention is the provision of a torque limiting clutch control system in which the clutch and control system are integrated at the system level, and are in communication with the drive engine such that the torque of the clutch may be set to match or accommodate the torque capability of the engine or drive system.

Another aspect of the invention is the provision of a torque limiting clutch control system that connects the toque limiting clutch and controller to the engine through a system controller area network (CAN).

A further aspect of the invention is the provision of a torque limiting clutch control system that embeds an integrated circuit containing a family of clutch characteristics that is presented for communication with the system CAN and the clutch controller.

Still a further aspect of the invention is the provision of a torque limiting clutch control system in which thermal sensors are imbedded in the friction pack of the torque limiting clutch for monitoring temperature and energy absorption during operation.

Yet a further aspect of the invention is the provision of a torque limiting clutch control system which constantly monitors the clutch operation and associated energy absorption to disengage the clutch when a threshold is exceeded.

Another aspect of the invention is the provision of a torque limiting clutch control system that adjusts clutch pressure as needed to ensure effective system operation and equipment protection, while accommodating anomalies that might be sporadically encountered.

Yet another aspect of the invention is the provision of a torque limiting clutch control system with ancillary monitors to sense and anticipate operational problems and disengage the clutch or shut down the system before such problems are actually encountered.

The foregoing and other aspects of the invention that will become apparent as the detailed description proceeds are achieved by a clutch control system interposed between an engine and driven equipment, comprising: a clutch assembly; an input speed sensor operatively connected to said clutch assembly for monitoring an input speed from the engine and producing an input speed signal corresponding thereto; an output speed sensor operatively connected to said clutch assembly for monitoring an output speed to said driven equipment and producing an output speed signal corresponding thereto; a pressure sensor operatively connected to said clutch assembly and presenting an output signal corresponding to clutch pressure; a pressure control valve operatively connected to said clutch assembly for regulating the application of actuating pressure to said clutch assembly; and a clutch control unit interconnected with said input and output speed sensors, pressure sensor and pressure control valve for regulating an application of clutch pressure as a function of said input and output signals.

DESCRIPTION OF DRAWINGS

For an understanding and appreciation of the various aspects of the invention, reference should be made to the following detailed description and accompanying drawings wherein.

BEST MODE FOR CARRYING OUT THE INVENTION

Figure 1:
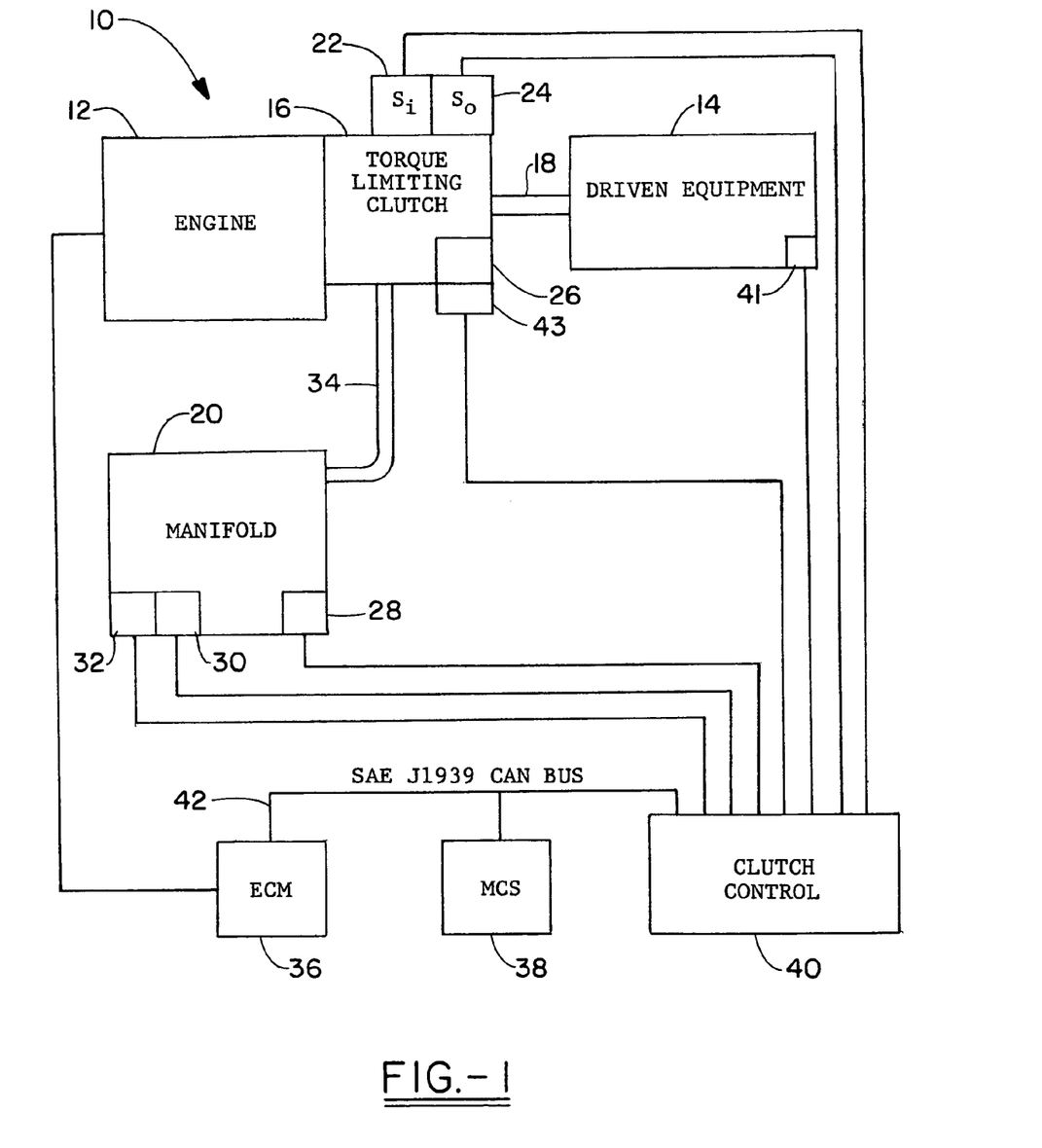
FIG. 1 is a functional block diagram of the torque limiting clutch control system made in accordance with the invention.

Referring now to the drawings and more particularly FIG. 1, it can be seen that a torque limiting clutch control system according to the invention is designated generally by the numeral 10. The system 10 includes an appropriate engine 12, such as a diesel engine or the like, interconnected with a piece of driven equipment 14, which may be of any of various types. Typically, the driven equipment 14 may be a chipper, grinder, rock crusher, auger, or any of numerous types of processing equipment. A hydraulic torque limiting clutch 16 is connected to the engine 12 on one side thereof and to the driven equipment 14 through an output shaft 18, on the other side thereof. Of course, people skilled in the art will understand that an appropriate input shaft may be interposed between the engine 12 and torque limiting clutch 16 rather than employing the direct connection as shown in FIG. 1.

A manifold 20 is employed in direct communication with the torque limiting clutch 16, as shown. The torque limiting clutch has associated therewith a plurality of sensors, some of which are associated directly with the clutch 16 and others with the manifold 20. As shown in FIG. 1, an input speed sensor 22 and an output speed sensor 24 are provided as a portion of the torque limiting clutch 16. The input speed sensor 22 monitors the rotational speed of the drive member coming from the engine 12, whether directly or through an appropriate input shaft or an internal gear in the clutch 16 or the like. In like manner, the output speed sensor 24 monitors the rotational output speed of the output shaft 18 or an internal gear of the torque limiting clutch as presented to the driven equipment 14. Output signals corresponding to the input and output speeds just described are provided electronically to a clutch control system as will be presented below. The clutch 16 also includes thermal sensors 26 that monitors the temperature of the friction pack of the torque limiting clutch 16. According to a preferred embodiment of the invention, the friction disk pack includes embedded thermal sensors that produce output signals by radio frequency transmission or the like to a receiver 43 which, in turn, passes a corresponding electrical signal to the clutch control unit 40. In similar fashion, a pressure transducer 28 is provided in association with the manifold 20 and emits an output signal corresponding to the hydraulic pressure applied to the clutch 16, the hydraulic pressure engaging the disks of the friction pack.

There may also be provided in association with the manifold 20 a hydraulic pressure valve 30 which is of the on/off type, which enables or disables the application of hydraulic pressure to the torque limiting clutch 16. Additionally, a proportional control valve 32 is provided as a portion of the manifold 20 to regulate the application of hydraulic pressure to the torque limiting clutch 16 by appropriate pulse width modulation or the like, as would be readily understood by those skilled in the art. Communication between the manifold 20 and the torque limiting clutch 16 is accomplished through a hydraulic line 34, as shown.

An electronic control module 36 is interconnected in standard fashion to the engine 12, as shown, and as is well understood by those skilled in the art. Such electronic control modules are routinely used by diesel engine manufacturers. Also included as part and parcel of the invention is a machine control system 38 of the type that is presently being commonly used by manufacturers of the driven equipment 14 to control the functions on those machines which, as presented above, can constitute grinders or the like. Finally, the system 10 also includes a clutch controller 40, which is primarily a dedicated microprocessor or the like, that serves primarily to maximize the operation of the system 10 as will become apparent below. The electronic control module 36, machine control system 38 and the clutch controller 40 are all interconnected with the SAE J1939 CAN 42. Those skilled in the art will readily appreciate that the CAN 42 provides for the data interconnection and intercommunication of structures such as the engine 12, driven equipment 14, clutch 16, manifold 20 and the like.

As shown in FIG. 1, the clutch controller 40 communicates not only with the CAN 42, but with the sensors and controls 22-32, 43 of the clutch and manifold 16,20 to effect the controlled operation thereof as will become apparent below.

According to one preferred embodiment of the invention, the system 10 is of such a nature that the driven equipment 14 comprises industrial wood grinding or rock crushing equipment of the type that is presently known. Such equipment typically utilizes the CAN 42 for communication between equipment components including the engine control module 36 and the machine control system 38.

According to the invention, the clutch controller 40 is also provided with such communication, as shown. It is well known to those skilled in the art of industrial clutches, that the torque setting of the clutch must be set with respect to the peak engine torque and horsepower capability of the engine. Matching the torque setting of the clutch 16 to the torque capability of the engine 12 or associated drive system is critical in protecting the drive system during shock loads and, in most cases, is simply manually set by the clutch manufacturer. However, according to the present invention, the clutch controller 40, though the CAN 42, may read a selected engine parameter associated with the engine 12, such as engine horsepower or peak torque, and then set the hydraulic pressure acting on the clutch piston, as through control of the valves 30, 32, in such a manner as to achieve a torque setting for the clutch that matches that of the engine, or a desired percentage thereof. The percentage will typically be set to achieve the desired safety factor or the like. In such a system, as is understood by those skilled in the art, the pressure applied to the clutch sets or establishes the torque of the clutch.

It is also contemplated as a part of the invention that the controller 40 may be such as to establish a default clutch pressure at a predetermined level, in the event that either engine horsepower or peak torque cannot be ascertained. The invention also contemplates that the clutch pressure may be set as a function of engine model number or the like. It is further contemplated that the clutch torque setting can be received as an input from a secondary controller, such as an MCS 38 associated with the driven equipment 14, or the like. Regardless of the source of the toque setting information, the concept of the invention is to employ a clutch controller 40 that receives various data regarding the power source and driven equipment in order to effect an appropriate clutch setting to maximize system operation while protecting both the power source and the equipment.

The invention also contemplates that an imbedded chip or the like may be included with the clutch 16, and in communication with the clutch controller 40, either directly or though the CAN 42, with the embedded chip providing critical clutch information to the controller 40. While clutch settings are typically determined in association with engine and load parameters, the capabilities of the clutch itself must also be given due regard. With the controller 40 being able to determine clutch size and characteristics, such characteristics may be considered in conjunction with engine parameters to set the proper clutch pressure/torque for the intended application. To achieve this structure, an imbedded integrated circuit containing relevant information regarding the clutch 16 may be attached to the clutch housing body, and wherein the clutch information includes clutch size, torque capacity, horsepower capacity and the like.

The concept of the invention incorporates pulse width modulated controls for providing a smooth clutch piston pressure ramp to engage the engine 12 to the high inertia load 14 without necessarily engaging and disengaging the power source. The invention contemplates the continuous engagement process that makes full use of the engine's ability to generate power, while saving fuel and maximizing environmental pollutants by not requiring the engine 12 to be decoupled from the high inertia load 14 during engagement. It is commonly known in the art of industrial clutches that excessive amounts of energy absorbed by a clutch friction path will cause premature wear and/or failure. The clutch controller 40 of the system 10 monitors the system parameters and then, through a series of calculations, closely determines the amount of energy being absorbed by the clutch 16. These parameters include engine speed vs. output speed, initial clutch pressure vs. current clutch pressure, and time elapsed during which the input speed and output speed are out of sync by a predefined difference. These parameters are employed to calculate the energy $E_1$ in accordance with the following formula:

$$E_1 = K_1(P_c - P_i)t_1(RPM_{in} - RPM_{out})$$

$E_1$ is energy absorbed by the clutch;
$K_1$ is a constant determined by the coefficient of friction, mean radius of the friction pack, and number of friction surfaces;
$P_c$ is the current pressure;
$P_i$ is the initial pressure;
$t_1$ is the amount of time during which input and output speeds differ;
$RPM_{in}$ is the input speed to the clutch 16; and
$RPM_{out}$ is the output speed of the clutch 16.

Accordingly, it can be seen from the above formula that energy buildup in the clutch 16 occurs as a consequence of the amount of time during which there is a difference in rotational speeds, and wherein the clutch pressure correlates with torque.

The clutch 16 also dissipates energy during periods of time in which there is no slippage in the friction pack. The energy dissipated is established by the formula:

$$E_2 = K_2 t_2, \text{ where}$$

$E_2$ is the energy dissipated while there is no slippage;
$K_2$ is an imperical constant taken from test data; and
$t_2$ is the time during which there is no slippage of disks in the friction pack.

Accordingly, it will be appreciated that if $E_1 - E_2$ exceed a particular threshold, the clutch 16 may experience damage. Accordingly, it is preferred that the clutch be disengaged before $E_1 - E_2$ exceeds such a threshold. The method for ensuring this result is shown by the flow diagram of FIG. 2, as practiced by the controller 40 of FIG. 1.

Figure 2:
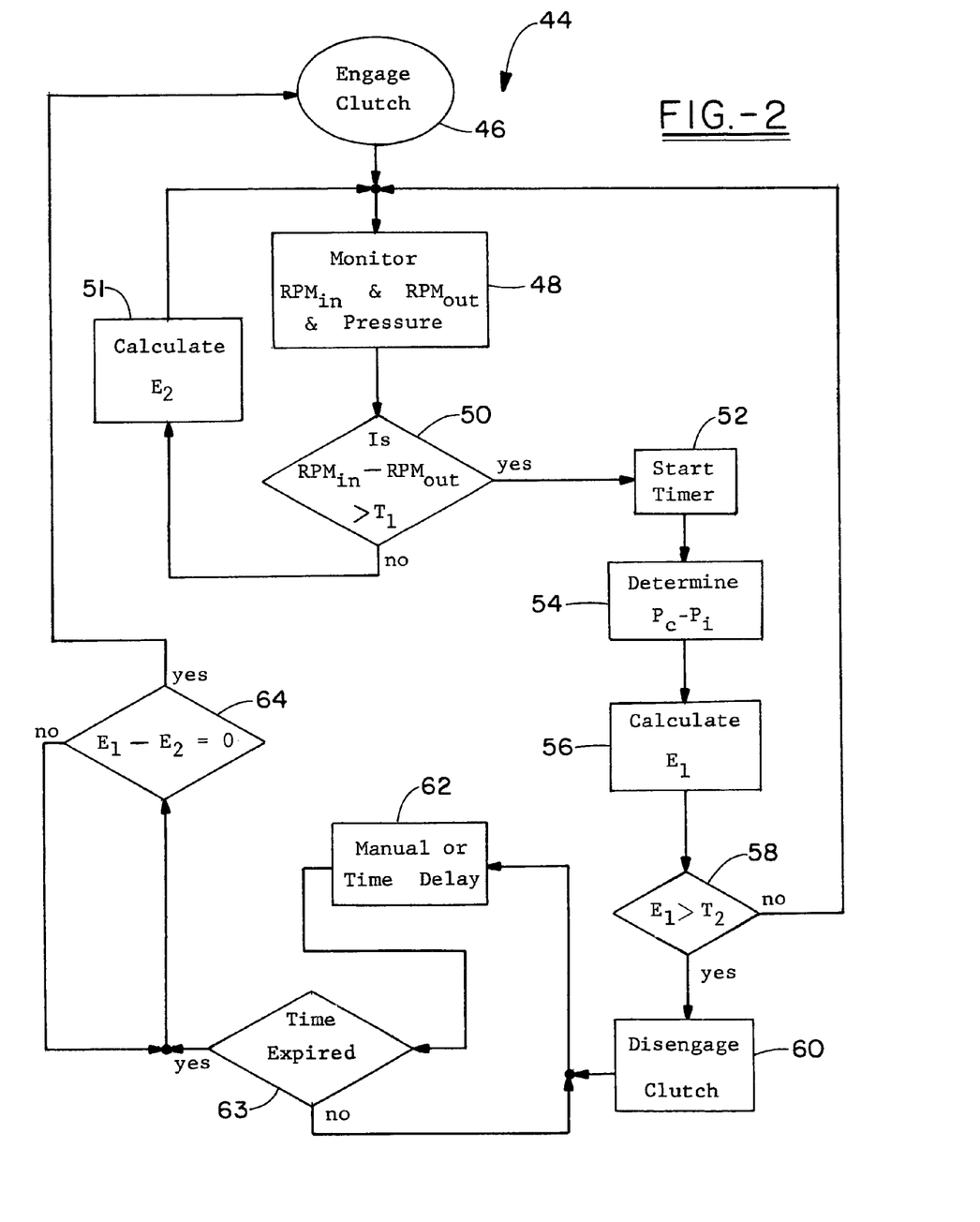
FIG. 2 is a flow diagram of a clutch overload protection methodology employed by the system of FIG. 1.

With reference now to FIG. 2, the process for ensuring against clutch overload is designated generally by the numeral 44. This sequence of operations begins at 46 with engagement of the clutch. Monitoring of the input and output speeds of revolution (RPM) and pressure is then undertaken at 48. At 50, a determination is made as to whether the input RPM minus the output RPM is greater than a threshold $T_1$. If not, $E_2$ is calculated at 51 and the operation continues and the monitoring of the input and output speeds of revolution and clutch pressure are monitored. If, however, the input RPM exceeds the output RPM by the threshold $T_1$, a timer is started at 52 and the current pressure PC minus the initial pressure $P_i$ is actively calculated at 54. Calculations of $E_1$ and $E_2$, are continually made.

A calculation of $E_1$ is made at 56. A determination is made at 58 whether the energy absorbed by the friction stack $(E_1)$ exceeds the energy dissipated by the stack $(E_2)$ by a second threshold $T_2$. If not, the process repeats at 48. In such event that a determination is made at 58 that $E_1$ exceeds a threshold $T_2$, the clutch is disengaged at 60 and then, following a time delay at 62, 63 $E_2$ is checked at 64 to determine if $E_1 - E_2 = 0$. If it does, then the clutch may be manually re-engaged at 46 and the process 44 is commenced anew.

It is common for the clutch 16 to be installed on industrial wood grinding equipment. Such equipment utilizes a power source, such as a diesel engine, and clutch to transmit power to a high inertia cutterhead which in turn grinds trees or waste chips into wood chips and mulch. It is not uncommon, when grinding this type of product, for large pieces of trees or even foreign metal to come into contact with the cutterhead. This will typically cause the cutterhead to come to an abrupt stop while the engine is still producing power. The clutch will normally slip momentarily to absorb such a shock load and then will have enough torque to stall the engine since the cutterhead is locked up. When this occurs, it is desired that the clutch controller 40 acts in such a way to disengage the clutch once the engine or clutch input speed or the clutch output speed have dropped to a predetermined threshold. This disengagement will act to prevent the engine from stalling, at which point the engine will return to high idle. This serves two primary purposes. First, allowing an engine to stall can cause damage to hot engine turbo chargers and possibly other engine components if the engine is not immediately restarted. By keeping the engine running, not only will damage to the turbo chargers be prevented, but clutch lubrication flow will cool the friction pack and return it to a normal operating temperature faster than if the engine had stalled, thus allowing the operator to begin grinding sooner. Further, once the engine stalls, the machine operator needs to climb down from the front-end loader or other equipment and restart the engine on the wood grinding machine. Accordingly, this feature of the invention not only protects all of the equipment of the system, but saves valuable operator and production time. Indeed, the operator simply needs to decelerate the engine to a normal acceptable clutch engagement speed and then re-engage the clutch.

Figure 3:
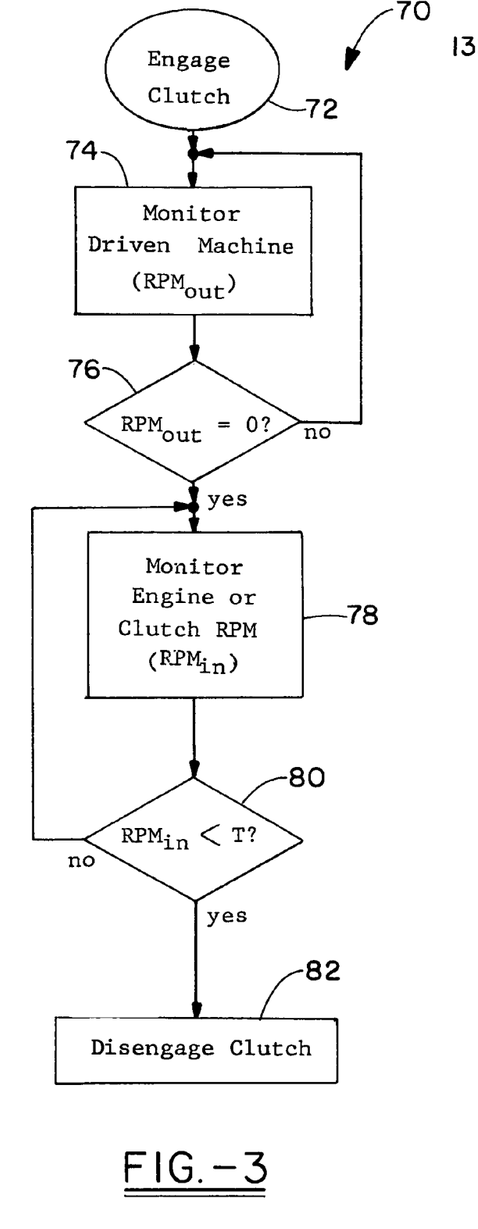
FIG. 3 is a flow diagram of an engine stall prevention technique employed by the system of FIG. 1.

In FIG. 3, a process for achieving this operation is designated generally by the numeral 70. Here, the clutch is engaged at 72 and monitoring of the rotational speed for the driven machine ($RPM_{out}$) is monitored at 74. This continues until the output revolution speed equals zero. When it does, the engine or input speed ($RPM_{in}$) to the clutch is monitored at 78. Should the input RPM be below a certain threshold T, the clutch is disengaged as at 82, awaiting re-engagement by the operator. It will be appreciated that the process 70 is undertaken continually during operation of the system 10.

As mentioned above, the instant invention contemplates that thermal sensors may be imbedded in the friction pack of the clutch 16 in the system 10. Indicia of the pack temperature is transmitted to the receiver 43, which presents a corresponding electrical signal to the clutch controller 40, as presented in FIG. 1. The thermal sensors 26 are intended as imbedded wireless thermal couples or electronic sensors mounting inside either the friction plates or separator plates, or both, to continually or intermittently monitor the core temperature of the friction pack. By being able to continuously monitor the friction pack temperature, accurate assessment of the amount of energy being absorbed by the friction pack is possible. Accordingly, once a predetermined temperature threshold is reached, disengagement of the clutch 16 can be effected to prevent damage.

Figures 4, 5:
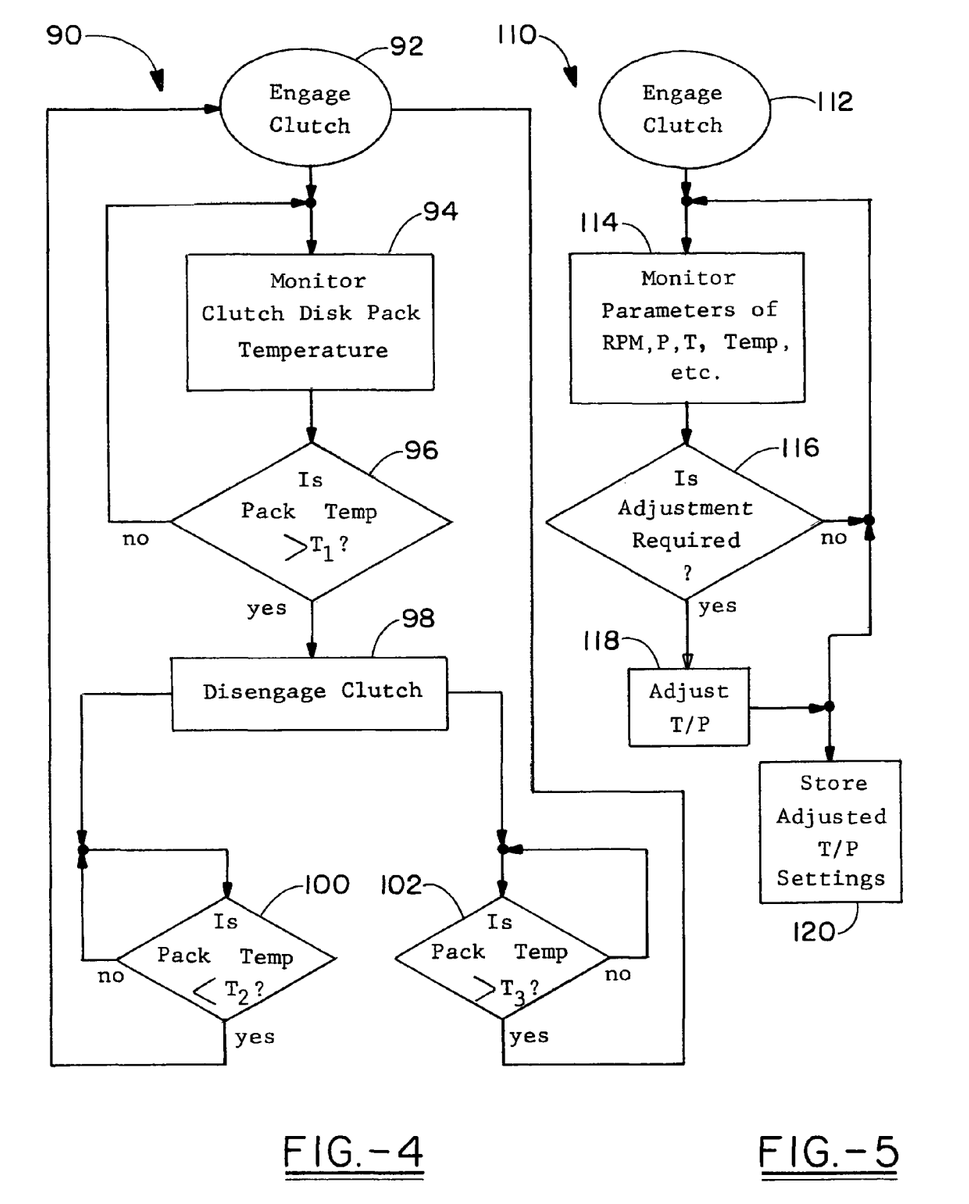
FIG. 4 is a flow diagram of the methodology employed by the system of FIG. 1 for monitoring the temperature of the clutch friction pack and taking remedial action as a function thereof.
FIG. 5 is a flow diagram of the methodology employed by the system of FIG. 1 for varying the clutch pressure and torque as a function of operational parameters.

With reference now to FIG. 4, it can be seen that a process for achieving the thermal protection just described is designated generally by the numeral 90. In this process, the clutch is engaged at 92 and monitoring of the clutch disk pack temperature is continually undertaken as at 94. At 96, a determination is made as to whether the pack temperature exceeds a threshold $T_1$. If not, operation and monitoring continues. However, in the event that pack temperature exceeds $T_1$, the clutch is disengaged under control of the controller 40, as at 98. Then, companion approaches to determine suitability for clutch re-engagement are entertained. At 100, a determination is made as to whether the pack temperature has now dropped below a second threshold $T_2$. When it has, the clutch may be re-engaged as at 92 and the process commences anew. Additionally or alternatively, a determination for re-engagement can be made based solely upon the expiration of time. At 102, determination is made following clutch disengagement as to whether or not the time following disengagement has exceeded a third threshold $T_3$. When it has, the clutch may be re-engaged as at 92 and the process commences anew. Accordingly, damage to the clutch 16 and/or engine 12 and driven equipment 14 can be averted by the thermal sensing and monitoring just described.

The system 10, employing a dedicated microprocessor in the controller 40, is further adapted for varying of clutch pressure and torque, as the need arises. As presented above, one application for the instant invention is in conjunction with the operation of wood grinding equipment driven by a diesel engine. This equipment is typically designed for the purpose of grinding wood waste, whole trees, stumps, limbs, and brush with the end product being mulch or wood chips. At times, this wood waste can be rather large in size and thus produce shock loads in the system that the clutch should be designed to absorb in an attempt to protect the drive system from severe shock loads. Here, this is accomplished through the use of system 10 and its capability of establishing a precise torque setting with respect to the engine and/or drive system. This control system has the ability, through close monitoring of the clutch input speed, output speed, and clutch pressure, to determine if the active grinding conditions are causing the clutch to slip too much or too little and thus not providing as much torque protection as efficiently possible. With the control system 10, these inputs can be actively determined "on the fly," and a determination can be made if a change in clutch pressure, and the corresponding change in clutch torque setting, may be warranted to most efficiently grind the wood or otherwise operate. Additionally, it is contemplated that the clutch pressure may be lowered to a lower pressure setting to minimize the ability of the engine to continue to drive though a heavy piece of metal. In this regard, the clutch is provided with the ability to accept a command from an external source to set the clutch pressure to a value other than the standard operating pressure when grinding wood waste contaminated with metal, or for different types of wood waste. The adaptive nature of the system 10 just described is achieved through the operational process presented directly below.

With reference now to FIG. 5, it can be seen that the process 110 is adapted for varying clutch pressure and torque for purposes presented above. The clutch is engaged as at 112, and monitoring of various operational parameters is undertaken at 114. These parameters may include the input and output speeds, clutch pressure (P), torque (T), frictional stack temperature (Temp), and the like. By monitoring these parameters, the controller 40 determines whether the active grinding conditions are causing the clutch to slip too much or too little and, makes the determination at 116 whether adjustment is required. If not, the monitoring simply continues. If, indeed, adjustment is required, the clutch pressure is adjusted as at 118 to increase or decrease the associated torque, as necessary. Upon such adjustment, the pressure and associated torque settings are stored in the clutch controller 40 as at 120, for future use, reference, or adjustment to maintain the clutch as adaptive as possible.

It is further contemplated that the controller 40 may regulate the output speed deceleration rate during the grinding operation. It is further contemplated that external control sources may be employed to regulate and vary the clutch pressure based upon the type of wood being ground, the metal contamination expected, or the like. In these regards, the clutch pressure may be controlled manually by an external hydraulic valve.

The instant invention also contemplates the implementation of forced disengagement of the clutch upon encountering the signature of a shock load or the like. As mentioned above, the system 10 is designed for various applications including the grinding of wood waste product. In such systems, it is not uncommon for various sized pieces of foreign metal to be mixed in with the wood waste product. This metal ultimately reaches the mill of the machine and, if heavy enough, bounces around in the mill box and creates severe damage, against which not even a clutch acting as a torque limiter can protect. It has been found that the best way to avoid further damage to the mill after the initial shock load is to stop the mill as fast as possible. The key, however, is to detect a difference between large pieces of wood as compared to various sized pieces of metal bouncing around in the mill. If the difference can be detected, then a command can be sent to the clutch controller to force the clutch to automatically disengage or shut off the engine, thus bringing the mill to a stop as quickly as possible.

In the system 10, shown illustratively in FIG. 1, various types of devices may be employed to signal a shock load and provide a corresponding signal to the clutch controller 40 in order to effect release of the clutch 16. One such approach monitors the output speed or RPM of the torque limiting clutch 16, which is the input to the grinder or driven equipment 14. A shock load may, in that embodiment, be determined from the output speed of the clutch 16 dropping below a set threshold. The shaft 18, which drives the equipment 14 may also be provided with an accelerometer, producing an output signal to the clutch controller 40 indicative of any changes in rotational speed. If such changes are indicative of a shock resulting from something other than wood, the clutch controller 40 may then disengage the clutch 16.

It is further contemplated that the driven equipment 14 may be provided with a piezoelectric transducer or an appropriate audio transducer to determine when a threatening activity is occurring. The piezoelectric transducer may sense the physical activity of a shock load, while an audio transducer may actually be employed to recognize the sound of metal within the mill as compared to wood. In either event, such a sensor transducer 41 may pass an appropriate signal to the clutch controller 40 which, in turn, regulates or releases the clutch 16 through the valves 30, 32. Alternatively, upon sensing a shock load above a particular threshold, the controller 40 may, through the CAN 42, terminate operation of the engine 12. Indeed, the invention contemplates the use of a secondary control source interconnected with the driven equipment 14 to sense or monitor the presence of shock loads and to effect termination of operation of the system before damage occurs.

Figure 6:
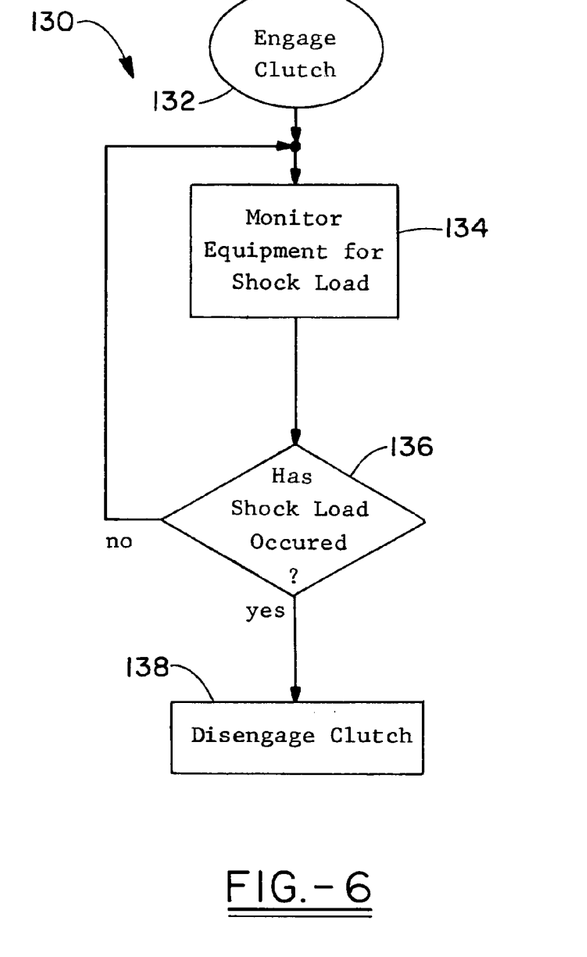
FIG. 6 is a flow diagram of a process employed by the system of FIG. 1 for detecting operational anomalies and effecting remedial action as a function thereof.

With reference now to FIG. 6, a flow diagram of the basic operation of the shock load system just described can be obtained. There, the process is designated generally by the numeral 130. The process begins with engagement of the clutch 132 such that the engine 12 is caused to drive the driven equipment 14 which, in this case, is a wood grinder. During operation, the equipment 14 is monitored at 134 for a shock load, by employment of the various devices presented above. When a sock load occurs, as determined at 136, the clutch is disengaged as at 138 such that the situation causing the shock load may be removed or otherwise remedied.

Thus it can be seen that the various aspects of the invention of providing a control system for maximizing operation of various equipment driven by an engine or the like has been presented above. The system of the invention, employing a dedicated microprocessor clutch controller is adapted to sense and respond to numerous and various operating parameters of the system in order to keep the system operating as effectively as possible, while ensuring that damage to the system does not occur.

While in accordance with the patent statutes only the best mode and preferred embodiment of the invention has been presented and described in detail, the invention is not limited thereto or thereby. Accordingly, for an appreciation of the true scope and breadth of the invention reference should be made to the appended claims.

What is claimed is:

1. A clutch control system interposed between an engine and driven equipment, comprising:
    a clutch assembly;
    an input speed sensor operatively connected to said clutch assembly for monitoring an input speed from the engine and producing an input speed signal corresponding thereto;
    an output speed sensor operatively connected to said clutch assembly for monitoring an output speed to said driven equipment and producing an output speed signal corresponding thereto;
    a pressure sensor operatively connected to said clutch assembly and presenting an output signal corresponding to clutch pressure;
    a pressure control valve operatively connected to said clutch assembly for regulating the application of actuating pressure to said clutch assembly;
    a clutch control unit interconnected with said input and output speed sensors, pressure sensor and pressure control valve for regulating an application of clutch pressure as a function of said input and output signals; and
    wherein said clutch control unit determines an amount of energy being absorbed by said clutch assembly from an assessment of said input and output speed signals, current and initial clutch pressure signals, and an amount of time elapsed during which the input speed and output speed are out of sync by a predefined difference.

2. The clutch control system according to claim 1, wherein said clutch control unit disengages said clutch assembly through said pressure control valve, when said amount of energy being absorbed exceeds a first threshold.

3. The clutch control system according to claim 2, wherein said clutch control unit re-engages said clutch assembly through said pressure control valve after a desired time of disengagement has elapsed and said control unit has determined that an amount of energy dissipated during periods of time that said input and output speeds are in sync is at a second threshold.

4. The clutch control system according to claim 3, wherein said second threshold is zero.

5. The clutch control system according to claim 1, wherein said clutch control unit monitors said input speed signal and, in the event said input speed signal is less than a given threshold, said clutch control unit disengages said clutch assembly through said pressure control valve.

6. The clutch control system according to claim 1, wherein said clutch control unit monitors said input and output speed signals and, in the event the output speed signal is zero and said input speed signal is less than a given threshold, said clutch control unit disengages said clutch assembly through said pressure control valve.

7. The clutch control system according to claim 1, further comprising a temperature sensor operatively connected to said clutch assembly and communicating with said clutch control unit, said temperature sensor sending a temperature signal to said clutch control unit corresponding to a temperature of said clutch assembly.

8. The clutch control system according to claim 7, wherein said temperature sensor comprises a sensor having a transmitter associated therewith and in communication with a receiver, said receiver being connected to and passing said temperature signal to said clutch control unit.

9. The clutch control system according to claim 7, wherein said clutch control unit disengages said clutch assembly through said pressure control valve when said temperature signal exceeds a given first threshold.

10. The clutch control system according to claim 7, wherein said clutch control unit engages said clutch assembly through said pressure control valve when said temperature signal drops below a second threshold.

11. The clutch control system according to claim 7, wherein said clutch control unit engages said clutch assembly through said pressure control valve when a set period of time has elapsed since said temperature signal exceeded said given first threshold.

12. The clutch control system according to claim 7, further comprising an engine control module connected to the engine, a machine control system connected to the driven equipment, and a CAN connecting said engine control module and machine control system to said clutch control unit and providing thereto data corresponding to engine and equipment parameters and clutch torque.

13. The clutch control system according to claim 12, wherein said clutch control unit receives said input and output speed signals, clutch pressure signal, temperature signal, and determines therefrom whether the driven equipment causes the clutch assembly to slip undesirably.

14. The clutch control system according to claim 13, wherein said clutch control unit adjusts said clutch pressure through said pressure control valve to achieve a desired torque.

15. The clutch control system according to claim 14, wherein values of said adjusted clutch pressure associated with said desired torque are stored by said clutch control unit for future use.

16. The clutch control system according to claim 12, wherein said CAN is an SAE J1939 CAN, providing data interconnection and intercommunication between the engine, driven equipment, and clutch assembly.

17. The clutch control system according to claim 16, wherein said clutch control unit matches a torque setting of the clutch assembly with a torque capability of the engine by setting clutch pressure through control of said pressure control valve.

18. The clutch control system according to claim 16, wherein said clutch control unit receives various data pertaining to operating parameters of the engine and driven equipment and effects a clutch pressure setting through said pressure control valve to optimize system operation while protecting both the engine and driven equipment from damage.

19. The clutch control system according to claim 18, wherein said clutch control unit further obtains data from said clutch assembly pertaining to operating parameters thereof, and effects a clutch pressure setting through said pressure control valve as a function thereof.

20. The clutch control system according claim 1, wherein the driven equipment is provided with a transducer connected to said clutch control unit, said transducer emitting a shock load signal indicative of a shock load experienced by the driven equipment, said clutch control unit disengaging said clutch assembly through said pressure control valve upon receipt of said shock load signal.

21. The clutch control system according to claim 20, wherein said transducer comprises an audio transducer.

22. The clutch control system according to claim 20, wherein said transducer comprises a piezoelectric transducer.

23. The clutch control system according to claim 20, wherein said transducer comprises an accelerometer.

* * * * *